United States Patent
Chernogorski

(12) 
(10) Patent No.: US 10,298,087 B2
(45) Date of Patent: May 21, 2019

(54) ELECTRIC MACHINE

(71) Applicant: AUDI AG, Ingolstadt (DE)

(72) Inventor: Vladimir Chernogorski, Ingolstadt (DE)

(73) Assignee: Audi AG, Ingolstadt (DE)

( * ) Notice: Subject to any disclaimer, the term of this patent is extended or adjusted under 35 U.S.C. 154(b) by 211 days.

(21) Appl. No.: 15/261,147

(22) Filed: Sep. 9, 2016

(65) Prior Publication Data

US 2017/0077786 A1    Mar. 16, 2017

(30) Foreign Application Priority Data

Sep. 10, 2015 (DE) .................. 10 2015 011 863

(51) Int. Cl.
| | |
|---|---|
| *H02K 5/20* | (2006.01) |
| *H02K 9/14* | (2006.01) |
| *H02K 9/04* | (2006.01) |
| *H02K 9/06* | (2006.01) |
| *H02K 9/12* | (2006.01) |

(52) U.S. Cl.
CPC ................. *H02K 5/20* (2013.01); *H02K 9/12* (2013.01)

(58) Field of Classification Search
CPC .. H02K 9/06; H02K 9/04; H02K 9/14; H02K 5/20
USPC ........................................................ 310/63
See application file for complete search history.

(56) References Cited

U.S. PATENT DOCUMENTS

| | | | |
|---|---|---|---|
| 2,650,313 A | 8/1953 | Wiedemann | |
| 3,435,263 A | 3/1969 | Willyoung | |
| 3,610,975 A * | 10/1971 | Onjanow | H02K 9/18 310/57 |
| 4,845,394 A | 7/1989 | Kleinhans | |

(Continued)

FOREIGN PATENT DOCUMENTS

| | | |
|---|---|---|
| CN | 101682232 A | 3/2010 |
| CN | 103875164 A | 6/2014 |
| DE | 1 003 343 | 2/1957 |

(Continued)

OTHER PUBLICATIONS

Chinese Search Report dated Jun. 26, 2018 with respect to counterpart Chinese patent application 201610812571.4.

(Continued)

*Primary Examiner* — Jeremy A Luks
(74) *Attorney, Agent, or Firm* — Henry M. Feiereisen LLC

(57) ABSTRACT

An electric machine, includes a rotor, a first radial fan wheel and a second radial fan wheel arranged on opposite sides of the rotor in axial direction, a first cooling air chamber and a second cooling air chamber; a first cooling air path extending in axial direction up to a side of the second radial fan wheel which faces away from the first radial fan wheel and from there leading into the second cooling air chamber, a second cooling air path extending in axial direction up to a side of the first radial fan wheel which faces away from the second radial fan wheel and from there leading into the first cooling air chamber, wherein the first radial fan wheel moves cooling air from the first cooling air chamber along the at least one first cooling air path and the second radial fan wheel moves cooling air from the second cooling air chamber along the at least one second cooling air path.

8 Claims, 5 Drawing Sheets

(56) References Cited

U.S. PATENT DOCUMENTS

2017/0149308 A1* 5/2017 Sayre .................. H02K 9/06
2017/0257007 A1* 9/2017 Braam .................. H02K 9/08

FOREIGN PATENT DOCUMENTS

| DE | 1003343 B | 2/1957 |
| DE | 1 024 161 | 2/1958 |
| DE | 1024161 B | 2/1958 |
| DE | 1 613 102 | 9/1970 |
| DE | 27 16 184 | 10/1977 |
| DE | 3724186 A1 | 1/1989 |

OTHER PUBLICATIONS

Translation of Chinese Search Report dated Jun. 26, 2018 with respect to counterpart Chinese patent application 201610812571.4.

* cited by examiner

ELECTRIC MACHINE

CROSS-REFERENCES TO RELATED APPLICATIONS

This application claims the priority of German Patent Application, Serial No. 10 2015 011 863.3, filed Sep. 10, 2015, pursuant to 35 U.S.C. 119(a)-(d), the disclosure of which is incorporated herein by reference.

BACKGROUND OF THE INVENTION

The invention relates to an electric machine.

The following discussion of related art is provided to assist the reader in understanding the advantages of the invention, and is not to be construed as an admission that this related art is prior art to this invention.

An electric machine can generally be constructed as an electric motor or a generator. The electric machine is for example a three-phase machine, in particular a three-phase asynchronous machine. It has a rotor, which is supported for rotation about a rotation axis, for example within a housing of the electric machine. The rotor preferably interacts with a stationary stator in order to either convert electric energy into a movement of the rotor or vice versa to convert the rotation of the rotor into electric energy.

The heat produced hereby has to be dissipated from the electric machine in order to prevent overheating and eventually temperature-related damage to the electric machine. For this purpose radial fan wheels, for example the first radial fan wheel and the second radial fan wheel are for example arranged on opposing sides of the rotor. The radial fan wheels are preferably operatively connected with the rotor, in particular rigidly. Correspondingly the radial fan wheels can be driven the by the rotor. The radial fan wheels can also be driven in a different manner. By means of the radial fan wheels a cooling air stream through the electric machine is generated, via which the heat generated in the electric machine can be at least partially dissipated.

It would be desirable and advantageous to provide an electric machine, which has advantages compared to known electric machines and in particular enables a more efficient cooling by means of the radial fan wheels.

SUMMARY OF THE INVENTION

According to one aspect of the present invention an electric machine, comprising a rotor rotatable about a rotation axis, a first radial fan wheel and a second radial fan wheel arranged on opposite sides of the rotor in axial direction of the electric machine; a first cooling air chamber and a second cooling air chamber; at least one first cooling air path extending in axial direction up to a side of the second radial fan wheel which faces away from the first radial fan wheel and from said side of the second radial fan leading into the second cooling air chamber, at least one second cooling air path extending in axial direction up to a side of the first radial fan wheel which faces away from the second radial fan wheel and from said side of the first radial fan leading into the first cooling air chamber, wherein the first radial fan wheel moves cooling air from the first cooling air chamber along the at least one first cooling air path and the second radial fan wheel moves cooling air from the second cooling air chamber along the at least one second cooling air path.

The first cooling air path thus fluidly directly adjoins the first cooling air chamber and extends directly up to the second cooling air chamber. Vice versa the second cooling air path directly adjoins the second cooling air chamber and extends up to directly to the first cooling air chamber. In both cases however the first cooling air chamber and the second cooling air chamber are not a component of the first cooling air path and the second cooling air path. Fluidly the first cooling air path ant the second cooling air path are thus located directly between the first cooling air chamber and the second cooling air chamber or vice versa. The first cooling air path and the second cooling air path are hereby completely fluidly separated from each other so that cooling air can neither pass directly, i.e., not via one of the cooling air chambers, form the first cooling air path into the second cooling air path or vice versa.

In axial direction viewed relative to the rotation axis of the rotor the first cooling air path directly adjoins the first cooling air chamber or even overlaps with the first cooling air chamber. The firs cooling air path extends in axial direction up to the side of the second cooling air chamber that faces away from the first cooling air chamber, i.e., starting from the first cooling air chamber past the second cooling air chamber. Subsequently the cooling air is introduced from this side into the second cooling air chamber. This also applies vice versa to the second cooling air path, which extends in axial direction from the second cooling air chamber or is arranged so as to overlap with the second cooling air chamber. The second cooling air path extends from the second cooling air chamber up to the side of the first cooling air chamber that faces away from the second cooling air chamber. From this side the second cooling air path then leads into the first cooling air chamber.

Both cooling air paths thus run through or traverse a large part of the electric machine when viewed in axial direction. By means of the described cooling air paths the heat generated in the electric machine can first be distributed so that the temperature in the electric machine, in particular the highest temperature occurring in the electric machine, can be kept below a maximally admissible temperature. Of course it can also be provided to cool the cooling air, in particular the cooling air that flows along the cooling air paths. For this purpose a heat exchanger can be provided in the first cooling air path and/or the second cooling air path.

According to another advantageous feature of the invention, the first cooling air path has a first axial flow region and the second cooling air path has a second axial flow region that are arranged so as to overlap with each other when viewed in axial direction and are spaced apart from each other in circumferential direction. The term axial flow region means a region of the first cooling air path or the second cooling air path in which the main flow direction along the corresponding cooling air path extends substantially or exactly in axial direction, i.e., the velocity component in axial direction is greater than the velocity component in other directions.

The axial flow regions of the cooling air paths are arranged so as to overlap in axial direction and hereby preferably extend parallel to each other. However, they are spaced apart from each other in circumferential direction with respect to the rotation axis. For example the axial flow regions of the cooling air paths are arranged uniformly distributed over the circumference of the electric machine. Hereby the axial flow regions can have the same distance to the rotation axis or as an alternative different distances to the rotation axis. The first axial flow region is thus for example arranged closer to the rotation axis than the second axial flow region or vice versa. Both axial flow regions preferably extend parallel to the rotation axis.

According to another advantageous feature of the invention, the first axial flow region is present in a first axial flow channel formed in a housing of the electric machine and/or that the second axial flow region is present in a second axial flow channel formed in the housing of the electric machine. The first axial flow channel and/or the second axial flow channel are thus formed in the housing. In the first axial flow channel and/or the second axial flow channel the respective axial flow region is present. Particularly preferably the housing of the electric machine engages at least partially, in particular completely around the first axial flow channel or the second axial flow channel in circumferential direction relative to the longitudinal center axis of the axial flow channel. The longitudinal center axis of the first axial flow channel or the second axial flow channel preferably extends parallel to the rotation axis.

According to another advantageous feature of the invention, a first heat exchanger is provided in the first axial flow region and/or a second heat exchanger is provided in the second axial flow region. The first heat exchanger or the second heat exchanger preferably serves for cooling the cooling air flowing along the respective axial flow region. For example the respective axial flow region or the respective axial flow channel forms a part of the heat exchanger. For example heat exchanger elements are arranged in the first axial flow channel or the second axial flow channel, which protrude into the respective axial flow channel. The heat exchanger elements are for example configured as ribs, wing structures, winglets and/or wedges.

According to another advantageous feature of the invention, ribs are used which protrude into the axial flow channel from opposite sides of the axial flow channel and are substantially arranged parallel to each other. The ribs have their greatest longitudinal extent for example in the direction of the main flow direction in the axial flow channel. It can also be provided that these ribs respectively only partially traverse the axial flow channel. Preferably however the ribs protrude into the axial flow channel to a degree so as to engage between two ribs that extend from the opposite side.

Cooling air, which flows along the axial flow region, as well as cooling fluid flow through the first heat exchanger and/or the second heat exchanger, wherein the cooling air is fluidly separated from the cooling fluid. The cooling fluid hereby has preferably a lower temperature than the cooling air so that heat can be transmitted from the cooling air to the cooling fluid and can be dissipated by the cooling fluid.

According to another advantageous feature of the invention, the first cooling air path has a first radial outflow region between the first radial fan wheel and the first axial flow region into which a coil of a stator of the electric machine at least partially protrudes and/or the second cooling air path has a second radial outflow region between the second radial fan wheel and the second axial flow region into which the coil of the stator of the electric machine at least partially protrudes. The first radial outflow region insofar forms a flow communication between the first cooling air chamber and the first axial flow region, while the second radial outflow region forms a flow communication between the second cooling air chamber and the second axial flow region.

According to another advantageous feature of the invention, the first axial flow region and/or the second axial flow region are arranged so that the coil of the stator, in particular an overhang of the stator, at least partially protrudes into first axial flow region and/or the second axial flow region. The cooling air which flows along the respective radial outflow region insofar flows over the stator or flows against the stator. Hereby the coil of the stator is effectively cooled by the cooling air.

According to another advantageous feature of the invention, the first radial outflow region and/or the second radial outflow region traverse a cooling sheath of the electric machine which is arranged in the housing. The cooling sheath serves for cooling the electric machine or for conducting heat away from the electric machine. Preferably the cooling sheath or the cooling fluid channel formed in the cooling sheath forms a part of the first heat exchanger and/or the second heat exchanger.

According to another advantageous feature of the invention, the first radial outflow region or the second radial outflow region extends through the cooling sheath for which the cooling sheath has a corresponding recess. Preferably this recess is formed in the cooling sheath spaced apart from the cooling fluid channel. By means of the cooling sheath thus on one hand a guiding of the cooling air along the first radial outflow region and/or the second radial outflow region is realized and on the other hand an efficient cooling of the electrical machine is achieved. For example the respective axial flow region directly adjoins the recess on the first radial outflow region or the second radial outflow region.

According to another advantageous feature of the invention, the first axial flow channel and/or the second axial flow channel are delimited in radial direction by an outer circumferential surface of the cooling sheath and an inner circumferential surface of the housing. The respective axial flow channel insofar extends between the cooling sheath and the housing. This means that cooling air flowing through the respective axial flow channel can give off heat to the housing as well as to the cooling sheath. From the housing the heat can be transferred directly to an outer environment of the electric machine. In the cooling sheath on the other hand, as explained above, the cooling fluid channel is provided so that heat introduced into the cooling sheath can be dissipated by means of the cooling fluid.

As a result of the above described configuration of the electric machine, which has the first cooling air path and the second cooling air path, an active cooling by means of the cooling sheath of the cooling fluid is generally not required. In this case the heat is transferred to the housing by the cooling air that flows through the first axial flow channel or the second axial flow channel and from the housing into the external environment for example by convection, in particular natural convection.

According to another advantageous feature of the invention, the first cooling air path between the first axial flow region and the second cooling air chamber has a first radial inflow region, which is present in a first radial inflow channel formed in the housing of the electric machine and/or that the second cooling air path between the second axial flow region and the first cooling air chamber has a second radial inflow region which is present in a second radial inflow channel formed in the housing of the electric machine. The first radial inflow region or the first radial inflow channel insofar forms a flow communication between the first axial flow region and the second cooling air chamber, while via the second radial inflow region or the second radial inflow channel a flow communication between the axial flow region and the first cooling air chamber is formed.

The first radial inflow channel or the second radial inflow channel is formed in the housing of the electric machine. It has a longitudinal center axis, which is at least approximately, in particular exactly, perpendicular to the rotation axis or to a straight line that is parallel to the rotation axis.

At its side that faces away from the first axial flow region the first radial inflow channel has at least one overflow opening through which the cooling air can enter the second cooling air chamber. Vice versa the second radial inflow channel has at its end that faces away from the second axial flow region at least one overflow opening through which the cooling air can enter the first cooling air chamber.

According to another advantageous feature of the invention, multiple overflow openings are assigned to the first radial inflow channel and/or the second radial inflow channel, which are spaced apart from each other in circumferential direction. For example the overflow openings have the same distance to the rotation axis in radial direction. The multiple overflow openings ensure a uniform and low-turbulent supply of the cooling air to the respective radial fan wheel.

In longitudinal section along the rotation axis or viewed in radial direction the overflow opening has a distance to the rotation axis that is smaller than the distance of fan blades of the first radial fan wheel to the rotation axis. Thus the cooling air is conducted to the respective cooling air chamber on a suction side of the respective radial fan wheel. Correspondingly by means of the radial fan wheel or the radial fan wheels an efficient supply of cooling air through the electric machine or the first cooling air path and/or the second cooling air path can be accomplished.

According to another advantageous feature of the invention, the first radial inflow channel is formed in a first bearing plate of the housing and/or the second radial inflow channel is formed in a second bearing plate of the housing of the electric machine. The housing has for example a housing sheath, which has openings at its two end sides that are closed by means of the bearing plate. The first bearing plate and the second bearing plate are insofar arranged on sides of the housing sheath that are opposite each another in axial direction or are fastened on the housing sheath. The first radial flow channel is assigned to the first bearing plate of the housing and the second radial inflow channel to the second bearing plate of the housing. Preferably the overflow openings of the respective radial inflow channel are also formed in the respective bearing plate.

According to another advantageous feature of the invention, multiple first cooling air paths can be provided, wherein respectively two of the first axial flow regions of the first cooling air paths are arranged opposite each other and/or that multiple second cooling air paths are provided, wherein respectively two of the second axial flow regions of the second cooling air paths are arranged opposite each other. By means of the multiple first cooling air paths or the multiple second cooling air paths the cooling efficiency for the electric machine can be further improved. Particularly preferably the axial flow regions of the respective cooling air path are arranged diametrically opposite each other with respect to the rotation axis. Particularly preferably the axial flow regions of all cooling air paths are distributed evenly in circumferential direction, so that a particularly uniform cooling of the electric machine is realized.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
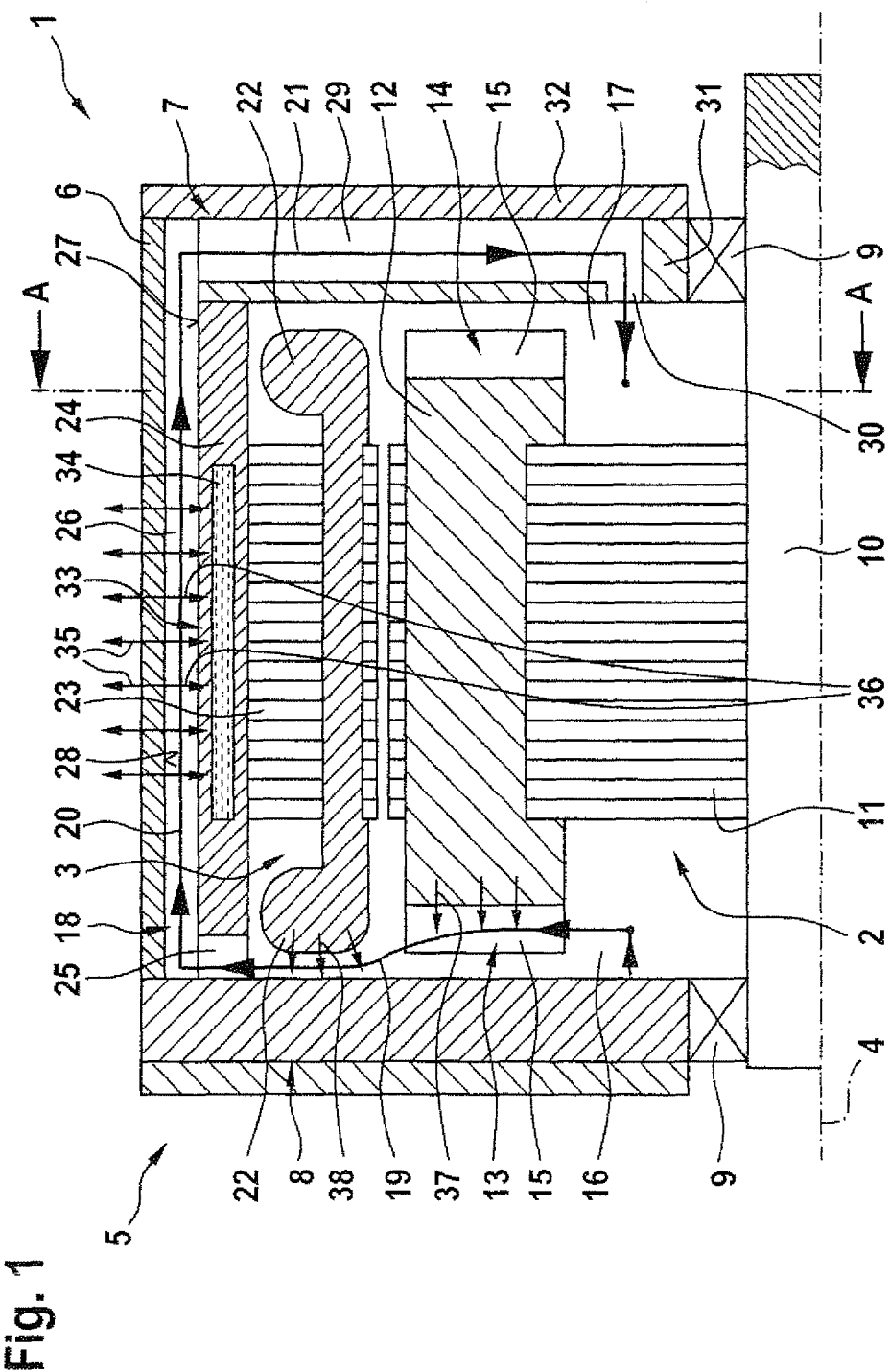
FIG. 1 shows a longitudinal sectional view of an electric machine on a first circumferential position.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a schematic longitudinal sectional view of an electric machine 1, which has a rotor 2 and a stator 3. The rotor 2 is supported in a housing 5 of the electric machine 1 for rotation about a rotation axis 4, while the stator 3 is arranged stationary in the housing 5. The housing 5 has for example a housing sheath 6 which at its end faces is provided with, and in particular closed with, a first bearing plate 7 and a second bearing plate 8. The bearing plates 7 and 8 have bearings 9, in particular rolling bearings, which serve for supporting a shaft 10 of the rotor 2.

On the shaft 10 a laminated rotor core 11 is arranged, and is in particular connected with the shaft 10 in rotative fixed relationship with the shaft. Via the laminated rotor core 11 a short circuit cage 12 is held on the shaft 10. Further a first radial fan wheel 13 and a second radial fan wheel 14 are arranged on the rotor 2. For example the radial fan wheels 13 and 14 are connected with the rotor 2 or the shaft 10 in rotative fixed relationship. For this purpose the radial fan wheels 13 and 14 are preferably arranged on the squirrel cage 12 and via the squirrel cage fastened on the laminated rotor core 11 and with this the shaft 10. The radial fan wheels 13 and 14 each have fan wheel blades 15 with which the cooling air can be transported in radial direction.

The first radial fan wheel 13 is situated in a first cooling air chamber 16, the second radial fan wheel 14 in a second cooling air chamber 17. Viewed in axial direction the cooling air chambers 16 and 17 are each situated between one of the bearing plate 7 and 8 on one side and the laminated rotor core 11 on the other side. In particular the cooling air chambers 16 and 17 are fluidly separated from each other in axial direction by the laminated rotor core 11. A first cooling air path 18 can be seen which has a first radial outflow region 19 a first axial flow region 20 and a first radial inflow region 21. The first radial outflow region 19 extends form the first cooling air chamber 16 or the first radial fan wheel 13 in radial direction outwards.

Hereby the first radial outflow region is arranged so that a coil 22 of the stator 3 or a stator overhang which has the coil 22 protrudes into it. The coil 22 or the corresponding stator overhang is for example arranged or fastened fixedly 9 in the housing 5. For example the laminated stator core 23 for this purpose engages on a cooling sheath 24 which is arranged in the housing 5. The first radial outflow region 19 traverses the cooling sheath 24 before transitioning into the first axial flow region 20. For this purpose the cooling sheath 24 has at least one first recess 25. The recess 25 is for example formed with open borders in the cooling sheath 24 so that the radial outflow region 19 at this site is delimited on one side by the cooling sheath 24 and on the other side by the bearing plate 8.

Directly adjoining the first radial outflow region 19 is the first axial flow region 20. The latter is situated in a first axial flow cannel 26 which is delimited by an outer circumferential surface 27 of the cooling sheath 24 and an inner circumferential surface 28 of the housing 5 in particular the housing sheath 6. For example the cooling sheath 24 has for forming the first axial flow channel 26 a recess which is open at its border and rests with regions of its outer circumferential surface 27 that are immediately adjacent the recess against the housing 5 or the housing sheath 6, in particular the inner circumferential surface 28.

Directly fluidly adjoining the first axial flow channel 20 is the first radial inflow region 21 which is present in a first radial inflow channel 29. The first radial inflow channel 29 is formed in the housing 5, in particular in the first bearing plate 7. On its side that faces away from the axial flow region 20 the radial inflow channel 29 has at least one overflow opening 30, preferably however multiple overflow openings 30. Via the overflow opening 30 the radial inflow channel 29 is fluidly connected with the second cooling air chamber 17. The overflow opening 30 has hereby preferably in radial direction a smaller distance to the shaft 10 or the rotation axis 4 than the second radial fan wheel 14 and in particular smaller than the fan blades 15 of the second radial fan wheel 14.

For forming the radial inflow channel 29 the first bearing plate 7 is for example formed by two bearing plate parts 31 and 32. Preferably the radial inflow channel 29 is formed with an open border in the bearing plate part 31. Also the at least one overflow opening 30 is situated in the bearing plate part 31. The bearing plate part 32 on the other hand is configured as a flat plate. During mounting of the electric machine 1 the bearing plate part 32 is placed on the bearing plate part 31 so that the radial inflow channel 29 is closed relative to an outer environment of the electric machine 1 so that now the radial inflow channel 29 is formed between the bearing plate parts 31 and 32.

Particularly preferably a first heat exchanger 33 is assigned to the first axial flow region 20. For this purpose the cooling sheath 24 has at least one cooling fluid channel 34 thought which cooling fluid can flow during operation of the electric machine 1. Along the axial flow region 20 heat can be either transferred from the cooling air to the housing according to the arrows 35 or the housing sheath 6, or can be dissipated from the housing into the outer environment. In addition or as an alternative the heat can, according to the arrows 36, be transferred to the cooling fluid present in the cooling fluid channel 34 by means of the heat exchanger 33 and be transported out of the electric machine 1 by the cooling fluid. Already in the radial outflow region 19 however heat can be transferred to the cooling air. This is illustrated by arrows 37 and 38, wherein on one hand heat is transferred from the rotor 2 and on the other hand from the stator 3 to the cooling air. Such a configuration of the electric machine 1 achieves a particularly efficient cooling.

Figure 2:
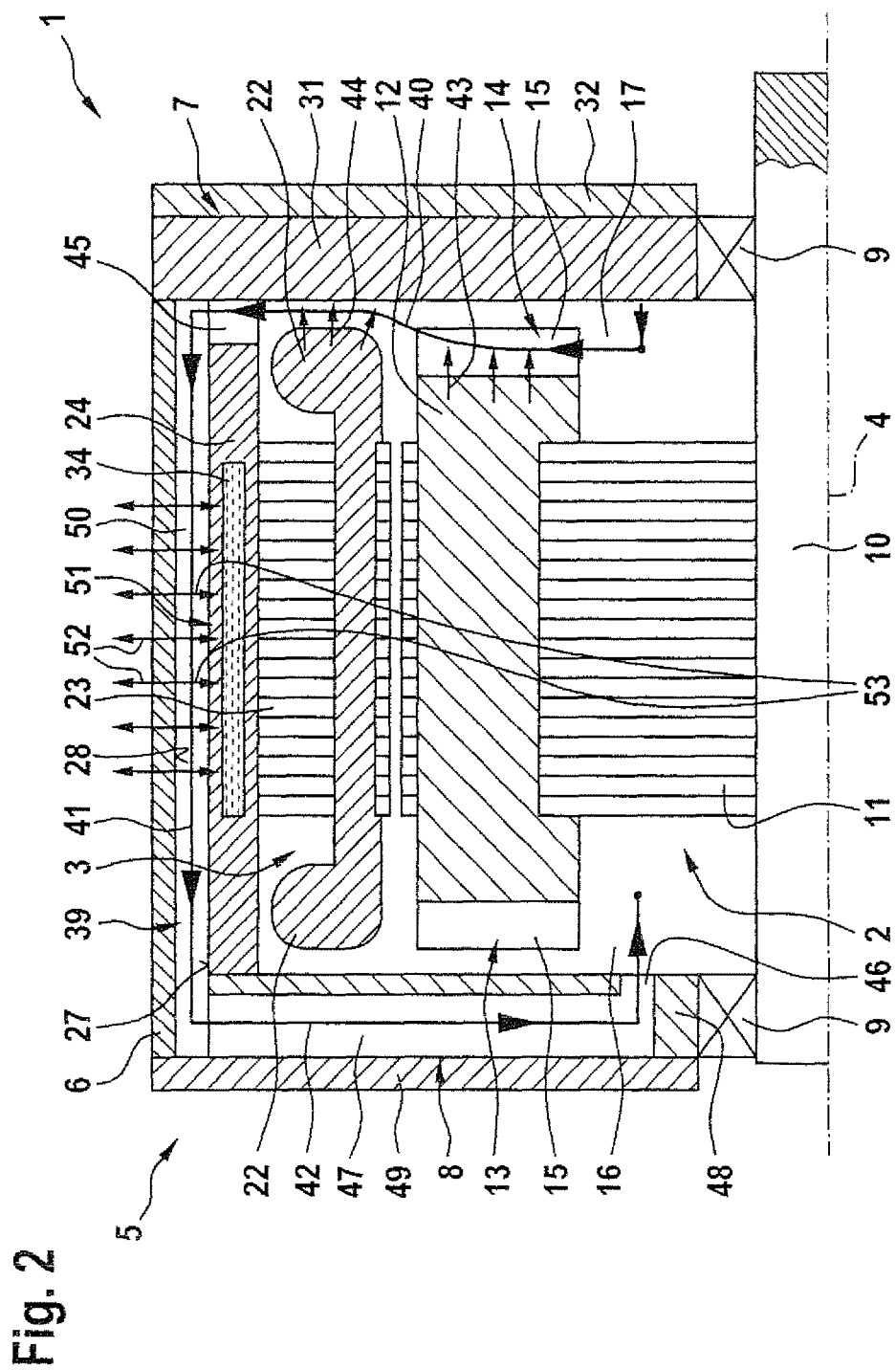
FIG. 2 shows a longitudinal sectional view of an electric machine on a second circumferential position.

FIG. 2 shows a longitudinal sectional view of the electric machine 1 at a different circumferential position. Generally reference is made to the description above. In the here shown representation a second cooling air path 39 can be seen, which has a second radial outflow region 40, a second axial flow region 41 and a second radial inflow region 42. The second cooling air path 39 extends from the second cooling air chamber 17 up to the first cooling air chamber 16. First the cooling air is transported from the second cooling air chamber 17 along the second radial outflow region 40, hereby the cooling air flows over the coil 22. In analogy to the description above heat can thus be transmitted from the rotor 2 and also from the stator 3 to the cooling air. This is indicated by arrows 43 and 44.

In the cooling sheath 24 a recess 45 is provided which can be configured analogous to the recess 25. Through the recess 45 the cooling air can enter the axial flow region 41. After flowing through the axial flow region the cooling air is conducted in the radial inflow region 42 in the direction of overflow openings 46 through which the cooling air can enter the first cooling air chamber 16 from a radial inflow channel 47 in which the radial inflow region 42 is located. The radial inflow channel 47 is configured analogous to the radial inflow channel 29 in the second bearing plate 8. For this purpose the bearing plate is made of for example bearing plate parts 48 and 49. The description above regarding the bearing plate parts 31 and 32 also applies to the bearing plate parts 48 and 49.

A second heat exchanger 51 is assigned to the axial flow region 41 that is situated in an axial flow channel 50. Accordingly heat can be transferred in the axial flow region 41 according to arrows 52 to the hosing 5 or the housing sheath and form the housing into the outer environment. In addition or as an alternative heat can also be transferred to the cooling fluid present in the cooling fluid channel 34 and be discharged with the cooling fluid. This is indicated by the arrows 53. Generally the first cooling air path 18 and the second cooling air path 39 are configured analogously but mirror symmetrically. Accordingly the respective description regarding one of the cooing air paths 18 or 39 can also be applied to the respective other cooling air path 39 or 18. It has to be noted that the cooling air paths 18 or 39 or at least their axial flow regions 20 and 41 are arranged offset to each other with respect to the rotation axis 4. Preferably the axial flow regions 20 and 41 overlap each other in axial direction however partially.

Figure 3:
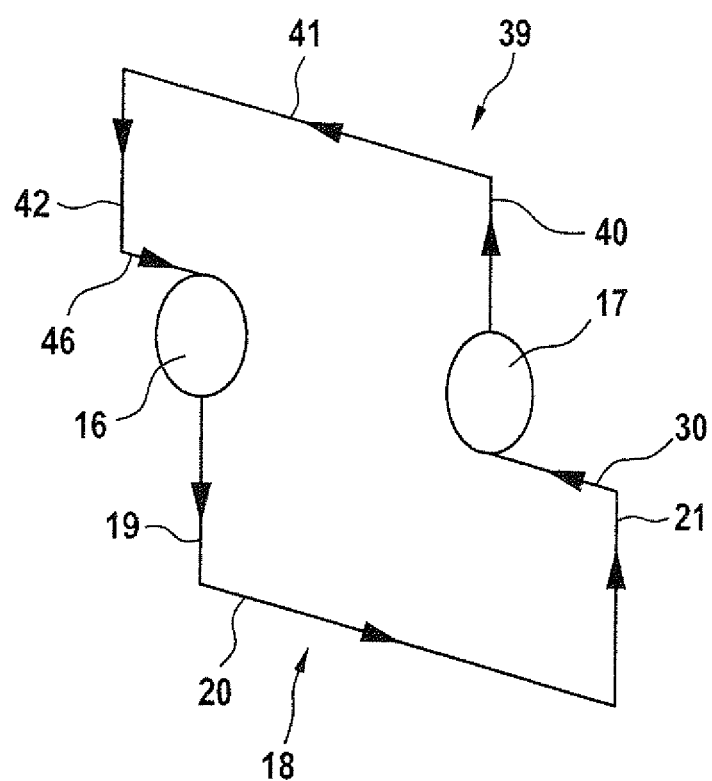
FIG. 3 shows a schematic representation of cooling air paths through the electric machine.

FIG. 3 shows a schematic representation of the cooling air paths 18 and 39. It can be seen that a closed circuit is present wherein the cooling air is conducted through the cooling air path 18 substantially in a first direction and through the cooling air path 39 in a second direction that is opposite the first direction. Hereby the cooling air reaches along the first cooling air path 18 from the first cooling air chamber 16 into the second cooling air chamber 17 and along the second cooling air path 39 form the second cooling air chamber 17 back into the first cooling air chamber 16.

Figure 4:
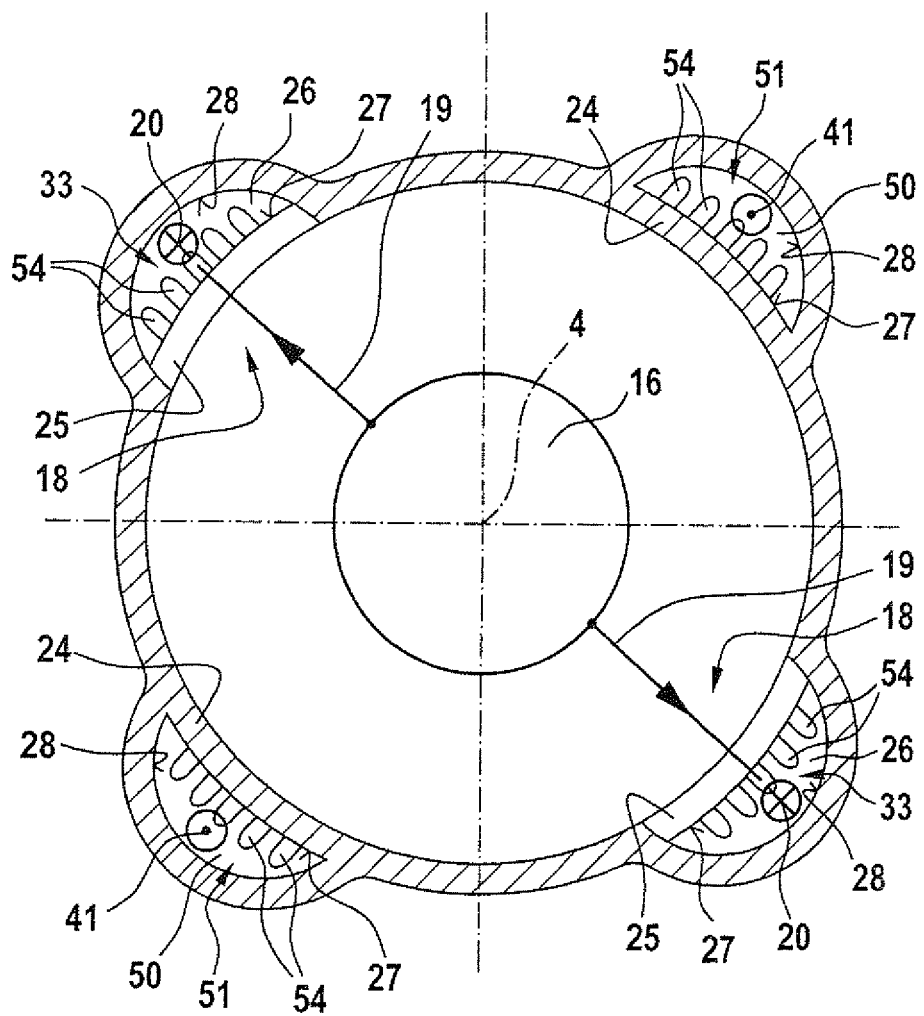
FIG. 4 shows a cross sectional view though a region of the electric machine in a first embodiment.

FIG. 4 shows a cross sectional representation of the electric machine 1 in a first embodiment. The section is hereby place along the sectional marks A indicated in FIG. 1. By way of the here shown embodiment it is clear that two first cooling air paths 18 and also tow second cooling air paths 29 are present. From the first one the radial outflow regions 19 and the axial flow regions 20 can be recognized in each case. Of the latter one only the axial flow regions 41 are indicated. Its is clear that in the axial flow regions 20 and 41 or the corresponding axial flow channels 26 and 50 respectively ribs 54, in particular axial ribs 54 are present. These serve for improving heat transmission from the cooling air to the cooling fluid. The ribs 54 are insofar assigned to the heat exchangers 33 and 51.

Figure 5:
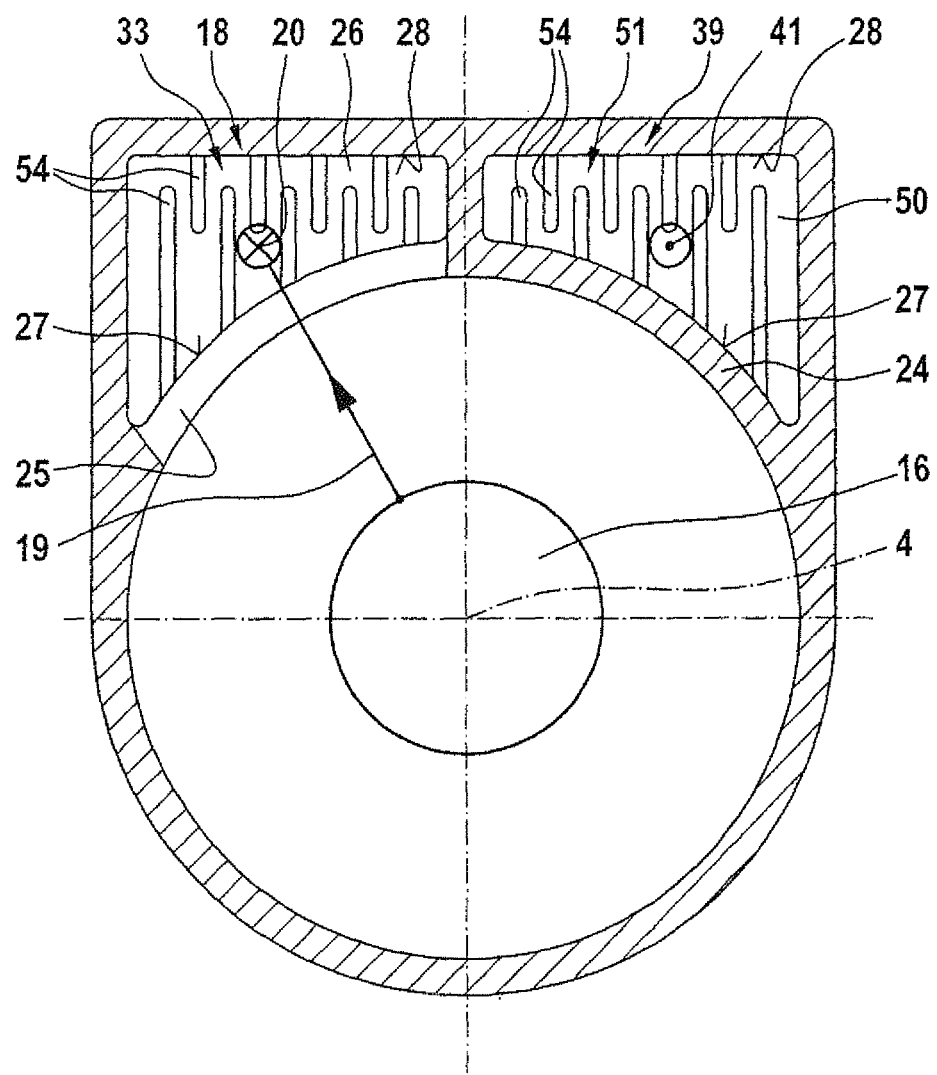
FIG. 5 shows a cross sectional view through a region of the electric machine in a second embodiment.

FIG. 5 shows cross section view of the electric machine 1 in a second embodiment. Reference is made to the description above and only the differences are discussed in the following. It can be seen that only one first cooling air path 18 and one second cooling air path 39 is present. It is provided that the axial flow regions 20 and 41 of the cooling air paths18 and 39 are situated in the same side of an imagined plane, which receives the rotation axis 4. Correspondingly the two axial flow regions 20 and 41 are located in the same side of the electric machine 1. Such a configuration of the electric machine 1 enables a compact housing 5. What is claimed as new and desired to be protected by Letters Patent is set forth in the appended claims and includes equivalents of the elements recited therein:

What is claimed is:

1. An electric machine, comprising
a rotor rotatable about a rotation axis,
a first radial fan wheel and a second radial fan wheel arranged on opposite sides of the rotor in an axial direction of the electric machine,
a first cooling air chamber and a second cooling air chamber;
at least one first cooling air path extending in the axial direction up to a side of the second radial fan wheel which faces away from the first radial fan wheel and from said side of the second radial fan leading into the second cooling air chamber,
at least one second cooling air path extending in the axial direction up to a side of the first radial fan wheel which faces away from the second radial fan wheel and from said side of the first radial fan leading into the first cooling air chamber,
wherein the first radial fan wheel moves cooling air from the first cooling air chamber along the at least one first cooling air path and the second radial fan wheel moves cooling air from the second cooling air chamber along the at least one second cooling air path,
wherein the at least one first cooling air path has a first axial flow region and the at least one second cooling air path has a second axial flow region, which overlap in axial direction and are spaced apart in circumferential direction,
wherein the at least one first cooling air path has a first radial inflow region between the first axial flow region and the second cooling air chamber, said first radial inflow region being situated in a first radial inflow channel formed in a housing of the electric machine, and the at least one second cooling air path has a second radial inflow region between the second axial flow region and the first cooling air chamber, said second radial inflow region being situated in a second radial inflow channel formed in the housing of the electric machine,
wherein for forming the radial inflow channels, the bearing plates are each formed by two bearing plate parts, wherein the radial inflow channels are formed with open borders in a first of the bearing plate parts, and a second of the bearing plate parts is placed on the first of the bearing plate parts so that the radial inflow channels are closed relative to an outer environment of the electric machine and formed between the bearing plate parts, and
wherein the first of the bearing plate parts has several overflow openings for each of the radial inflow channels, via which overflow openings one of the radial inflow channels is fluidly connected with the first cooling air chamber and another of the radial inflow channels is fluidly connected with the second cooling air chamber.

2. The electric machine of claim 1, wherein the first axial flow region is situated in a first axial flow channel formed in a housing of the electric machine, and/or the second axial flow region is situated in a second axial flow channel formed in the housing of the electric machine.

3. The electric machine of claim 1, further comprising at least one of a first heat exchanger and a second heat exchanger, said first heat exchanger being arranged in the first axial flow region, said second heat exchanger being arranged in the second axial flow region.

4. The electric machine of claim 1, constructed in at least one of two ways,
a first way in which the first cooling air path has a first radial outflow region between the first radial fan wheel and the first axial flow region, wherein a coil of the stator of the electric machine at least partially protrudes into the first outflow region, and
a second way in which the second cooling air path has a second radial outflow region between the second radial fan wheel and the second axial flow region wherein a coil of the stator of the electric machine at least partially protrudes into the second radial outflow region.

5. The electric machine of claim 4, wherein at least one of the first radial outflow region and the second radial outflow region traverse a cooling sheath of the electric machine, said cooling sheath being arranged in the housing, wherein at least one cooling fluid channel is formed in the cooling sheath.

6. The electric machine of claim 5, wherein at least one of the first axial flow channel and the second axial flow channel are delimited in radial direction by an outer circumferential surface of the cooling sheath and an inner circumferential surface of the housing.

7. The electric machine of claim 1, wherein at least one of the first radial inflow channel and/or the second radial inflow channel is formed in respective bearing plates of the housing of the electric machine.

8. The electric machine of claim 1, further comprising multiple said first cooling air paths, wherein two respective ones of the first axial flow regions of the first cooling air paths are situated opposite each other and/or multiple second cooling air paths are provided, wherein two respective ones of the second axial flow regions of the second cooling air paths are situated opposite each other.

* * * * *